(12) United States Patent
Brogan et al.

(10) Patent No.: US 9,115,830 B1
(45) Date of Patent: Aug. 25, 2015

(54) JACKETED LINE COUPLING

(75) Inventors: Edward P. Brogan, DeForest, WI (US);
Corey M. Hoel, Portage, WI (US)

(73) Assignee: Badger Ridge Industries, LLC, DeForest, WI (US)

( * ) Notice: Subject to any disclaimer, the term of this patent is extended or adjusted under 35 U.S.C. 154(b) by 658 days.

(21) Appl. No.: 13/396,067

(22) Filed: Feb. 14, 2012

(51) Int. Cl.
*F16L 39/04* (2006.01)
*F16L 9/147* (2006.01)

(52) U.S. Cl.
CPC .................................. *F16L 9/147* (2013.01)

(58) Field of Classification Search
CPC ........... F16L 39/005; F16L 39/04; F16L 9/18; F16L 9/19; F16L 9/20; F16L 27/12; F16L 39/00; F16L 59/141; F16L 59/21; F16L 51/00
USPC .................. 285/123.1, 123.3, 123.12, 123.15, 285/123.17, 187, 41, 47, 904, 145.1, 145.4, 285/302, 121.2
See application file for complete search history.

(56) References Cited

U.S. PATENT DOCUMENTS

| | | | |
|---|---|---|---|
| 3,270,769 A | 9/1966 | Kaiser et al. | |
| 4,017,102 A | 4/1977 | Henderson | |
| 4,127,286 A | 11/1978 | Albertsen | |
| 4,445,332 A * | 5/1984 | Thies et al. | 60/455 |
| 4,850,616 A * | 7/1989 | Pava | 285/41 |
| 5,018,260 A | 5/1991 | Ziu | |
| 6,257,625 B1 * | 7/2001 | Kitani et al. | 285/2 |
| 6,533,334 B1 | 3/2003 | Bonn | |
| 6,565,127 B2 | 5/2003 | Webb et al. | |
| 2009/0021006 A1 | 1/2009 | Hobbs | |
| 2010/0230953 A1 | 9/2010 | Baylot et al. | |
| 2011/0041934 A1 | 2/2011 | Holler | |
| 2012/0228865 A1 * | 9/2012 | Sopoliga et al. | 285/123.15 |

OTHER PUBLICATIONS

Proprietary envelope item 1: Redacted sketch dated Aug. 26, 2008.
Proprietary envelope item 2: CAD illustration.

* cited by examiner

*Primary Examiner* — James Hewitt
(74) *Attorney, Agent, or Firm* — Stiennon & Stiennon

(57) ABSTRACT

A conduit assembly has a slip coupling arrangement which allows two separate process or product flow streams with differential temperatures to flow side by side while subject to repeated cycles of thermal expansion and contraction. An inner pipe extends through an outer pipe with an annular plate welded therebetween as a liquid-tight seal at an assembly first end. A slip coupling outer element is fixed to the outer pipe at a second end and has two O-rings engaged within grooves. A slip coupling inner element is fixed to the inner pipe and extends within the outer element with a land which engages the O-rings, allowing thermal expansion and contraction of the conduit assembly with the inner element moving axially with respect to the outer element while retaining a liquid tight seal therebetween. For large temperature variations or long conduit runs, the slip coupling may be longer with polymer slider rings.

12 Claims, 3 Drawing Sheets

JACKETED LINE COUPLING

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to conduits and couplings in general, and more particularly to conduits for carrying materials at different temperatures.

There are many manufacturing processes where materials of different temperatures must be conveyed through the same conduit. Due to the phenomenon of thermal expansion, solid conduits will become longer when temperature is increased, and shorter when temperature is decreased. This effect can become especially pronounced when multiple fluids of different temperatures are conveyed through coaxial conduits. In some food processing plants, for example, temperature-sensitive food product is conveyed through an interior conduit and is maintained within a suitable temperature range by a coolant fluid flowing through an exterior volume located between the interior conduit and an exterior conduit. At regular intervals the food product is flushed from the interior conduit and a hot fluid is coursed through the interior conduit to clean it in place. This cleaning may take place while the coolant is still present in the exterior conduit. Unless very expensive materials such as Invar metal (64FeNi) are used, the difference in temperature will cause such a change in dimension of the inner pipe and the outer pipe, that failure of the materials may result. Stainless steel, a common material used in sanitary food processing, has a thermal coefficient of expansion of about $31 \times 10^{-6}$ which will cause more thermal stress depending on the temperature differential and the length of the two sections held at different temperatures. As the stress to which the conduit is exposed approaches the yield strength in any part of the duct structure, the number of heating and cooling cycles before leaking will decrease. When the stresses are in the plastic range for the duct material, fatigue cracking occurs very rapidly.

In many sanitary situations cooled conduits may be tens or even hundreds of feet long which makes accommodating thermal expansion a critical issue. Thus connections between the hot and cold portions of the conduit may become fatigued or ruptured, especially with repeated cycling of the conduit assembly, greatly shortening the useful lifetime of the conduit assembly or requiring frequent downtime and repairs. One known approach employs a bulky and costly attachment assembly.

What is needed is a conduit assembly for multiple fluid flows which can accommodate the thermal cycling over an extended period of time.

SUMMARY OF THE INVENTION

The slip coupling of this invention is used with an inner and outer coaxial pipe, one end of the inner and one end of the outer pipes are spaced apart and welded together by use of an annular plate, the other end the inner and outer pipes are connected by the slip coupling which accommodates thermal expansion. The slip coupling arrangement allows two separate process or product flow streams with differential temperatures to flow side by side while subject to repeated cycles of thermal expansion and contraction. The inner pipe extends through the outer pipe, with the inner pipe defining an interior conduit, and an outer conduit being defined between the outer pipe and the inner pipe. The annular plate is welded between the inner and outer pipes to serve as a liquid-tight seal at a first end of the assembly.

The slip coupling assembly has an inner element fixed to the inner pipe, and an outer element fixed to the outer pipe. The slip coupling outer element is fixed to the outer pipe at a second end, spaced axially from the first end. The slip coupling outer element can be fixed to the outer pipe by welding or a fitting which can be disassembled such as a TRI-CLAMP® sanitary fitting. The outer element has two inwardly facing circumferential grooves, each with an elastomeric seal such as an O-ring received therein. The slip coupling inner element is permanently fixed to the inner pipe such as by welding. The O-rings of the outer element slide on a raised land of the inner element, forming a seal which provides for axial movement between the inner and outer pipes.

The elastomeric seals engage the slip coupling inner element land in a liquid-tight seal, such that thermal expansion and contraction of the conduit assembly causes the slip coupling inner element to move axially with respect to the slip coupling outer element while retaining a liquid tight seal therebetween. The coupling can be adapted to any plumbing end connections, and couplings can be designed for any desired temperature swing for a range of pipe lengths. For large temperature variations or long conduit runs, the slip coupling may have a greater axial extent, and additional grooves may be formed on the outer element which receive polymer rings which slide on the slip coupling inner element to maintain the inner and outer pipe concentric while the O-rings provide the liquid-tight seal.

It is an object of the present invention to provide a conduit which has an inner pipe and an outer pipe and wherein the inner and outer pipes may have different temperatures without subjecting the conduit to damaging thermally induced fatigue cycling.

It is another object of the present invention to provide a sanitary conduit which accommodates thermal expansion between an inner and outer pipe.

It is a further object of the present invention to provide a double wall conduit thermal accommodation slip joint which can be readily retrofitted in existing plumbing systems.

Further objects, features and advantages of the invention will be apparent from the following detailed description when taken in conjunction with the accompanying drawings.

DESCRIPTION OF THE PREFERRED EMBODIMENTS

Figure 1:
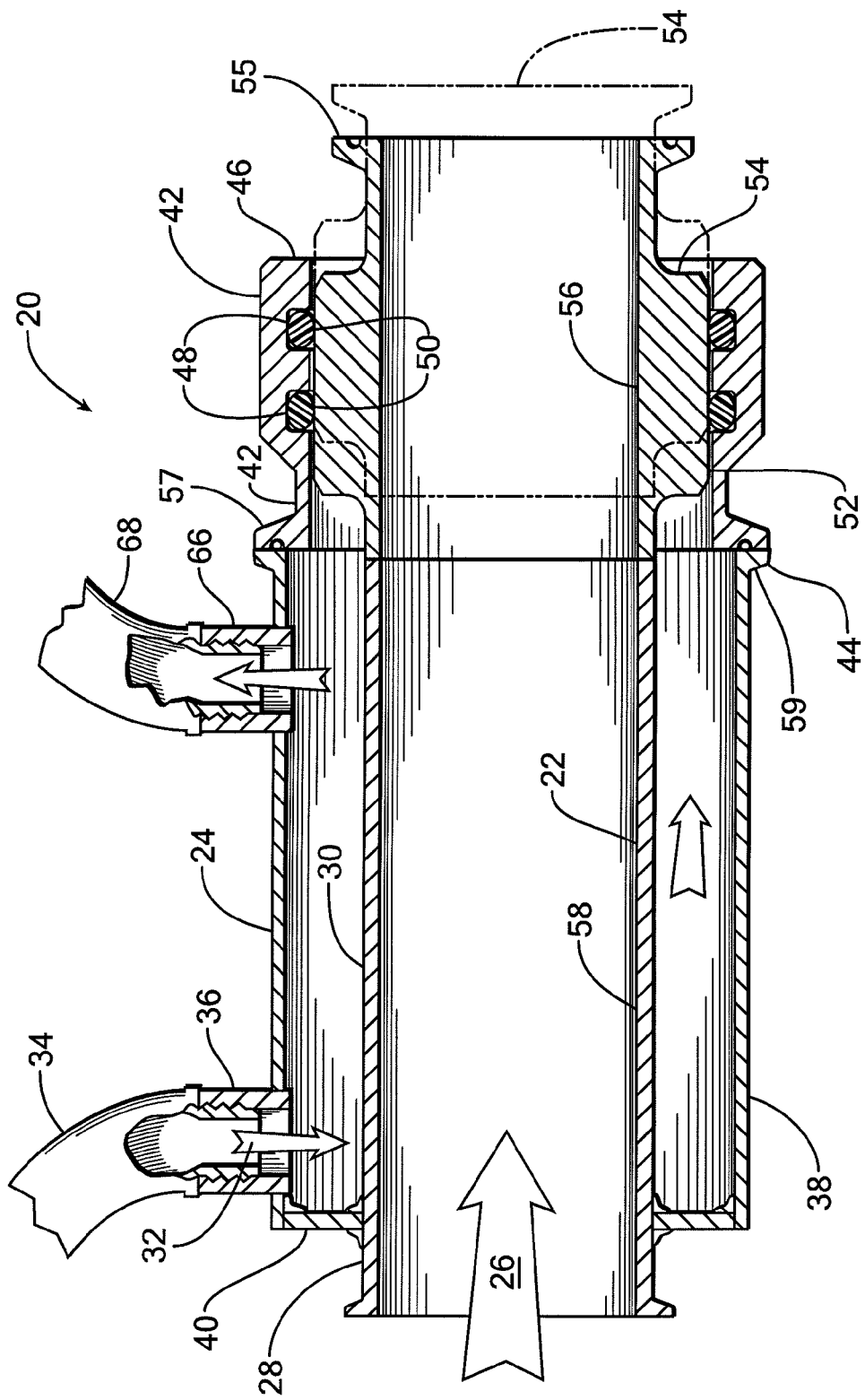
FIG. 1 is a cross-sectional view of a conduit assembly having an inner conduit and an outer conduit joined by a slip coupling which accommodates differential thermal expansion.
Figure 2:
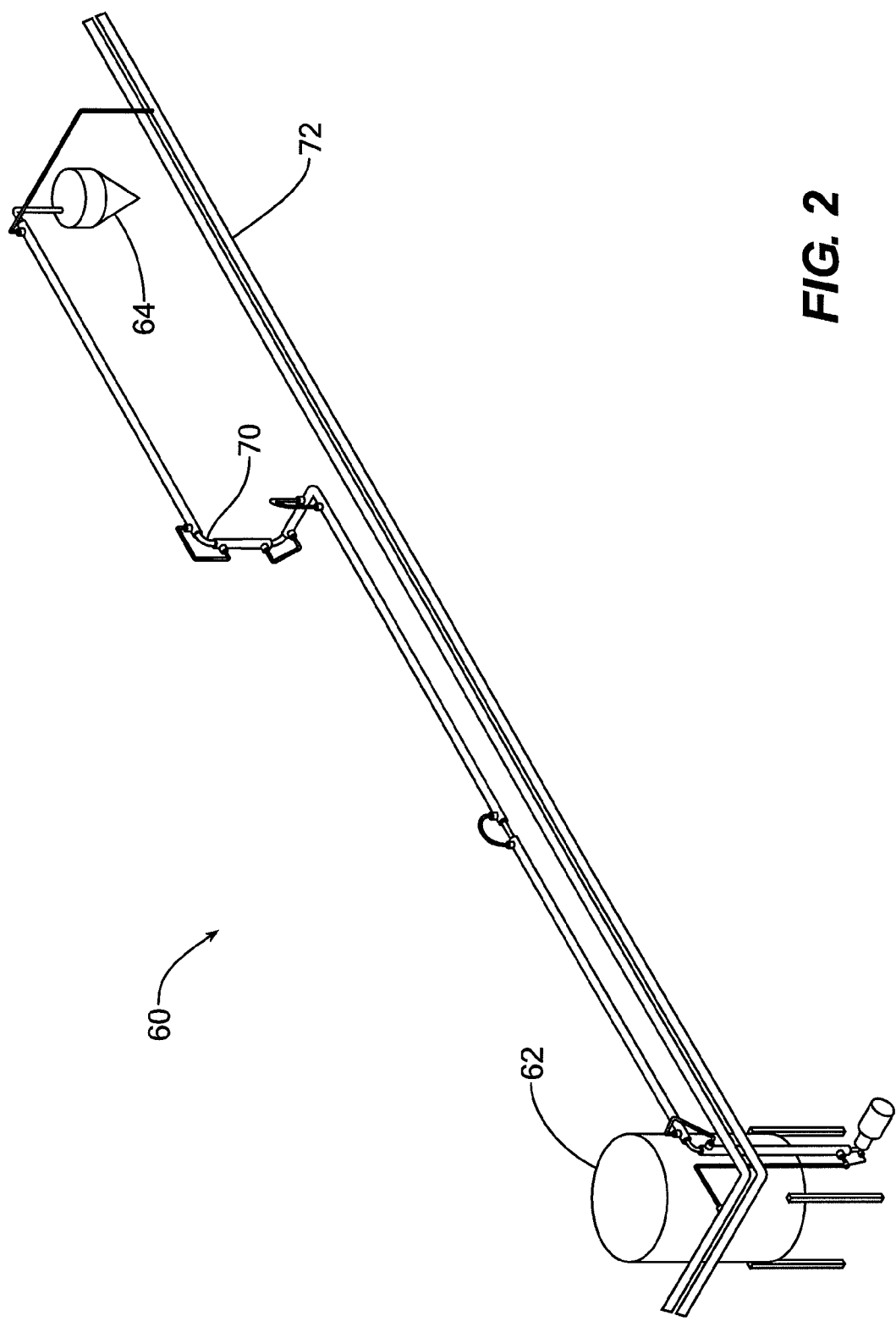
FIG. 2 is a schematic view of an industrial process employing the conduit assembly of FIG. 1.
Figure 3:
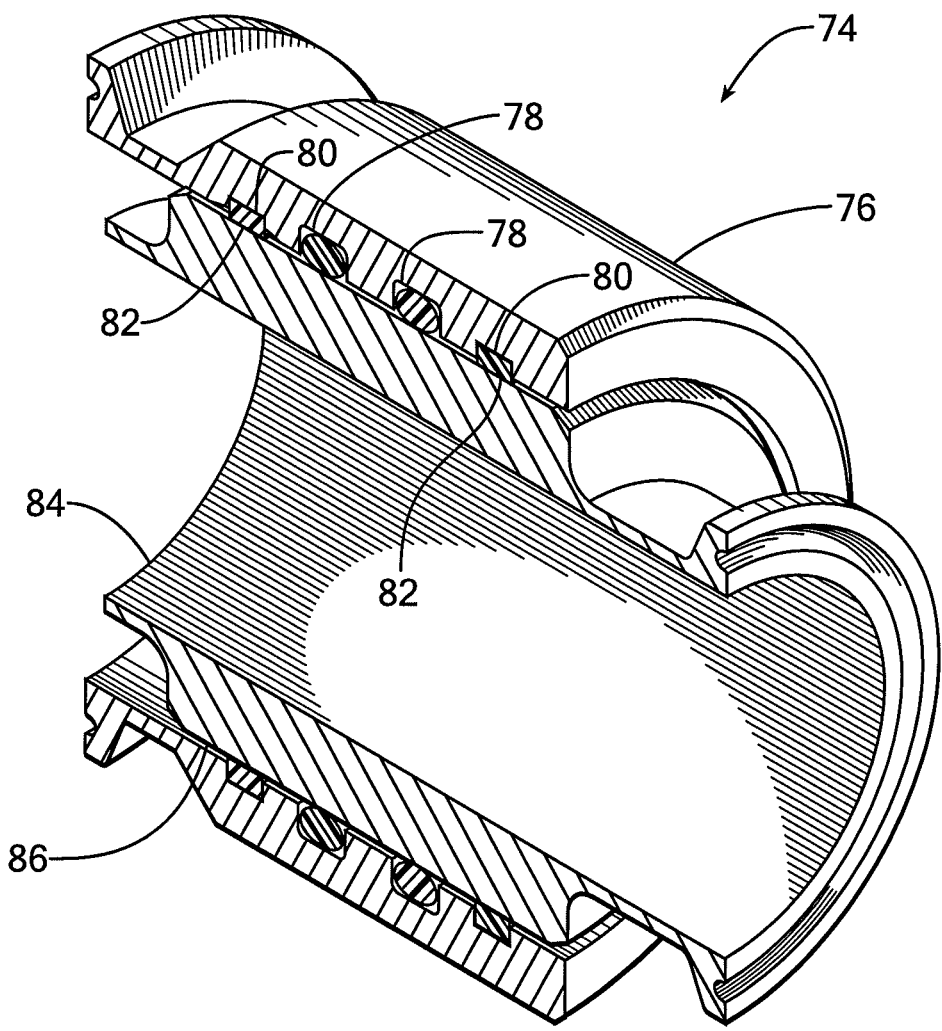
FIG. 3 is an isometric view, broken away in section, of an alternative slip coupling for a conduit assembly, arranged to accommodate a more extensive thermal expansion differential.

Referring more particularly to FIGS. 1-3, wherein like numbers refer to similar parts, a conduit assembly 20 is shown in FIG. 1. The conduit assembly 20 is comprised of an inner conduit 22 which extends within an outer conduit 24. The two conduits 22, 24 permit two materials to be conveyed in the same conduit system, allowing heat transfer between the materials, but maintaining physical separation between the materials at all times. The assembly 20, which is used within a manufacturing and packaging facility such as is shown in FIG. 2, is illustrated in FIG. 1 and may be used, for example, to convey a food product which must be chilled, such as yogurt, in an inner flow path, while simultaneously conveying a cooling fluid in the region defined between the outer pipe and the inner pipe along an outer flow path.

The inner flow path extends through an inner pipe 30 and through the inner element 54 of a slip coupling 42 and then on to the next conduit assembly. The outer flow path extends through the region defined between an outer pipe 38 and the inner pipe 30, and extends between similar regions of other conduit assemblies 20 through hoses 34, 68.

The first material 26 (such as yogurt) enters the conduit assembly 20 at a first end 28 and passes through the inner pipe 30 which may be comprised of a stainless steel pipe. The second material 32 (such as a propylene glycol coolant) enters the conduit assembly through a first hose 34 which is connected to an inlet fitting 36 in the outer pipe 38, which may also be a thin-walled stainless steel cylinder. The assembly 20 may be manufactured to any desired length, although with longer runs the amount of thermal expansion and contraction which must be accommodated will also increase. The length of the assembly 20 may be ten or twenty feet. It will be noted that the length of the assembly 20 is shown considerably shortened for purposes of illustration in FIG. 1.

The outer pipe 38 is fixed to the inner pipe 30 at the first end 28 by an annular plate 40 which is weleded in place to form a liquid-tight seal, for example with Argon purge welding. The slip coupling assembly 42 is located at the opposite second end 44 of the assembly 20. The slip coupling assembly 42 has an outer element 46 which is fixed to the outer pipe 38, such as by a conventional TRI-CLAMP® sanitary fitting manufactured by Alfa Laval Inc., Kenosha, Wis., and known generically as a tri-clover fitting, described in ISO 2852, Stainless Steel Clamp Pipe Couplings for the Food Industry. The slip coupling outer element 46 has a radially projecting flange or ferrule 57 which adjoins and is clamped to a flange 59 on the outer pipe 38, with a gasket therebetween. The gasket and clamp are not shown in the illustrations.

The slip coupling outer element 46 has two axially spaced circumferential grooves 48 which face inwardly. Each groove 48 receives an elastomeric seal, for example a rubber or polymeric O-ring 50. The O-rings 50 bear against the cylindrical radially protruding land 52 of a slip coupling inner element 54. The inner element 54 is fixed, such as by welding, to the inner pipe 30. The inner element 54 has a radially projecting flange or ferrule 55 which is attached to a mating element on the next conduit assembly or connector. It will be noted that the although the land 52 could be formed with a diameter to match the outer diameter of the inner pipe, when used with a Tri-Clamp fitting as illustrated, the inner element land 52 must have a diameter at least as large as the diameter of the ferrule 55 to permit the slip coupling outer element to clear the ferrule when it is removed from the assembly. When alternative fittings are used, it would be possible to employ a slip coupling outer element with a narrower interior diameter such that the O-rings engage directly with an inner slip coupling element with an outer diameter which matches the inner pipe outer diameter.

The interior bore 56 of the slip coupling inner element 54 is preferably the same diameter as and coaxial with the interior bore 58 of the inner pipe 30. The interior bore of the slip coupling inner element 54 thus defines part of the inner conduit 22.

As shown in FIG. 1, the conduit assembly 20 can accommodate differential thermal expansion between the inner pipe and the outer pipe, which are permanently fixed at the first end, but free to move axially with respect to each other at the second end. An example of the conduit assembly in use is the thermal cycling involved in a manufacturing installation 60 is illustrated in FIG. 2, where a yogurt storage bin 62 is connected by a series of conduit assemblies 20 to a container fill station 64. The cooled yogurt 26 is conveyed through the inner conduit 22 to the fill station 64. The outer conduit 24 is supplied with chilled propylene glycol 32. The propylene glycol 32 passes in the inlet fitting in the outer pipe, along the inner pipe, and out an outlet fitting 66 and through a second hose 68 to the next conduit assembly 20. Adjacent conduit assemblies are connected by right angle elbows 70 which will accommodate the thermal expansion of the connected conduit assemblies. The yogurt 26 is dispensed at the fill station 64, and the cooling glycol 32 is recirculated through a return line 72. The yogurt may be retained at a temperature of about 40 degrees F. by a chilled propylene gylcol solution which is circulated through the outer flow path.

Periodically, the yogurt 26 is flushed from the inner conduit 22, and a clean in place operation is initiated. This cleaning process involves circulating hot cleaning liquids through the inner pipes 30, the inner slip coupling elements 54, and the elbows 70. The cleaning fluids, usually water, a caustic solution, and a sanitizer, will be at about 168 degrees F., and are carried out with the cooling fluid retained, but not flowing, within the outer flow path. These portions of the conduit assembly, thus heated, will expand, causing the inner slip coupling element 54 to extend outwardly. This expansion is possible without destruction to the assembly, because the O-rings maintain a liquid-tight seal while the inner slip coupling element moves axially past the outer slip coupling element.

With longer uninterupted pipe runs within a single conduit assembly, the slip coupling assembly must be longer to accommodate the greater amount of anticipated thermal expansion. A slip coupling assembly 74 for a longer conduit assembly is shown in FIG. 3. The slip coupling assembly 74 has an outer slip coupling element 76 with two circumferential grooves 78 which each receive an elastomeric seal or O-ring. The elastomeric seal grooves 78 are positioned between two additional grooves 80 which each receive a plastic slider ring 82. The plastic rings 82 do not add to the liquid-tight seal, but they assist the smooth extension of the inner slip coupling element 84 with its exterior land 86 with respect to the outer slip coupling element 76. The slider rings are preferably formed of a polymer such as UHMW (Ultrahigh-molecular-weight polyethylene) or lower coefficient of expansion polymer material, or other polyemers such as nylon or or the Zytel brand Nylon material manufactured by DuPont.

It is understood that the invention is not limited to the particular construction and arrangement of parts herein illustrated and described, but embraces all such modified forms thereof as come within the scope of the following claims.

We claim:

1. A conduit assembly comprising:
   an outer pipe;
   an inner pipe extending through the outer pipe, wherein an inner conduit is defined within the inner pipe, and an outer conduit is defined between the inner pipe and the outer pipe;

an end wall fixed to the inner pipe, and extending outwardly to be fixed to the outer pipe to define a liquid-tight seal between the inner pipe and the outer pipe at a first end of the conduit assembly;

a slip coupling outer element fixed to the outer pipe at a position spaced axially from the conduit assembly first end, the outer element having a circumferential first groove;

a slip coupling inner element fixed to the inner pipe to extend within the slip coupling outer element, and having a circumferential outwardly facing land; and an elastomeric seal engaged within the slip coupling outer element first groove and engaging the slip coupling inner element land in a liquid-tight seal, such that thermal expansion and contraction of the conduit assembly causes the slip coupling inner element to move axially with respect to the slip coupling outer element while retaining a liquid tight seal therebetween.

2. The conduit assembly of claim 1 wherein the elastomeric seal comprises a first O-ring.

3. The conduit assembly of claim 2 further comprising:
portions of the of the slip coupling outer element which define a second groove; and
a second O-ring disposed within the second groove and engaged with the slip coupling inner element land.

4. The conduit assembly of claim 3 further comprising:
portions of the slip coupling outer element which define a third groove and a fourth groove, wherein the first groove and the second groove are positioned axially between the third groove and the fourth groove;
a first slider ring engaged within the third groove; and
a second slider ring engaged within the fourth groove, wherein the first slider and the second slider engage the slip coupling inner element land.

5. The conduit assembly of claim 4 wherein the slider rings are formed of polymer material.

6. The conduit assembly of claim 1 further comprising:
a first hose connected to a first fitting in the outer pipe to permit fluid material to enter between the inner pipe and the outer pipe; and
a second hose connected to a second fitting in the outer pipe, spaced axially from the first fitting, to permit fluid material to be withdrawn from between the inner pipe and the outer pipe.

7. The conduit assembly of claim 1 wherein the slip coupling outer element is releasably fastened to a flange extending from the outer pipe; and wherein the slip coupling inner element is welded to the inner pipe to project axially through the slip coupling outer element.

8. The conduit assembly of claim 1 wherein the slip coupling inner element has a radially projecting flange which extends to a first diameter, and wherein the slip coupling inner element land extends radially a second diameter which is at least as great as the first diameter, to permit the slip coupling outer element to pass over the inner element flange when separated from its attachment to the outer pipe.

9. A conduit assembly comprising:

an outer pipe;

an inner pipe extending through the outer pipe, the inner pipe having an interior passage, wherein an inner conduit is defined within the inner pipe, and an outer conduit is defined between the inner pipe and the outer pipe;

an end wall fixed to the inner pipe, and extending outwardly to be fixed to the outer pipe to define a liquid-tight seal between the inner pipe and the outer pipe at a first end of the conduit assembly;

a slip coupling outer element fixed to the outer pipe at a position spaced axially from the conduit assembly first end, the outer element having a circumferential first groove;

a slip coupling inner element welded to the inner pipe to extend within the slip coupling outer element, and having a circumferential outwardly facing land, the inner element having an interior passageway which connects to the interior passageway of the inner pipe; and an elastomeric seal engaged within the slip coupling outer element first groove and engaging the slip coupling inner element land in a liquid-tight seal, such that thermal expansion and contraction of the conduit assembly causes the slip coupling inner element to move axially with respect to the slip coupling outer element while retaining a liquid tight seal therebetween.

10. The conduit assembly of claim 9 further comprising:
a first hose connected to a first fitting in the outer pipe to permit fluid material to enter between the inner pipe and the outer pipe; and
a second hose connected to a second fitting in the outer pipe, spaced axially from the first fitting, to permit fluid material to be withdrawn from between the inner pipe and the outer pipe.

11. The conduit assembly of claim 9 wherein the slip coupling outer element is releasably fastened to a flange extending from the outer pipe.

12. The conduit assembly of claim 9 wherein the slip coupling inner element has a radially projecting flange which extends to a first diameter, and wherein the slip coupling inner element land extends radially a second diameter which is at least as great as the first diameter, to permit the slip coupling outer element to pass over the inner element flange when separated from its attachment to the outer pipe.

* * * * *